United States Patent [19]

Dadgar et al.

[11] Patent Number: 4,948,648
[45] Date of Patent: Aug. 14, 1990

[54] FIRE RESISTANT LAMINAR CUSHIONING MATERIAL

[75] Inventors: Billie B. Dadgar; Thomas J. Walter, both of Baton Rouge, La.

[73] Assignee: Ethyl Corporation, Richmond, Va.

[21] Appl. No.: 448,611

[22] Filed: Dec. 11, 1989

[51] Int. Cl.⁵ ............................................. B32B 3/26
[52] U.S. Cl. ...................................... 428/71; 428/76; 428/284; 428/286; 428/287; 428/316.6
[58] Field of Search .................. 428/71, 76, 284, 286, 428/287, 316.6; 521/189

[56] References Cited

U.S. PATENT DOCUMENTS

| | | | |
|---|---|---|---|
| 4,536,520 | 8/1985 | Mueller | 521/189 |
| 4,619,860 | 10/1986 | Brown et al. | 428/316.6 |
| 4,870,113 | 9/1989 | Mueller et al. | 521/189 |

Primary Examiner—William J. Van Balen
Attorney, Agent, or Firm—Richard J. Hammond

[57] ABSTRACT

A composite fire resistant laminar cushioning material is disclosed. The material comprises a foamed polyphosphazene upper lamella and a foamed polyurethane lower lamella. The foamed polyphosphazene further comprises a lamelliform substantially unfoamed outer first layer and a substantially foamed second layer. The cushioning material is capable of passing the Cal-133 flammability test.

29 Claims, 1 Drawing Sheet

FIRE RESISTANT LAMINAR CUSHIONING MATERIAL

This invention relates to a laminar cushioning material that is resistant to and does not participate in fire. More particularly, this invention relates to a laminar cushioning material comprising an outer layer of foamed polyphosphazene and an inner layer of foamed polyurethane.

PRIOR ART

Pressure for increased flammability resistance of bedding and furniture materials has been on the rise over the last few years. Federal standards originally implemented for cigarette smolder resistance to mattresses has given way to more comprehensive requirements for furniture, aircraft seats and the like including open flame and vertical flame tests.

The typical structure of cushioning material comprises a core of fire resistant polyurethane having an upholstery outer cover. Smolder resistance is commonly acceptable. In full-scale real life fires, the outer fabric cover rapidly breaks down and the polyurethane core becomes involved in the fire, producing large volumes of potentially lethal smoke, combustible gases and toxic fumes. In order to pass FAA regulations, seat manufacturers have chosen to use a foam core seat cushion fully encased by a fire-blocking sheet which delays the onset of ignition and retards involvement of the core in the fire. However, such fire blocking sheet is not a requirement of any present Federal or state regulations for furniture or bedding materials.

Mueller in U.S. Pat. No. 4,818,603 discloses a heavy metal loaded polyphosphazene septum bonded to the surface of a foamed polyimide.

Thompson U.S. Pat. No. 3,994,838 describes polyaryloxy phosphazene foams and suggest their use as thermal insulation because of their fire resistance.

Polyorganophosphazenes are known compositions Polyaryloxyphosphazenes are described in U.S. Pat. No. 3,856,713. Polyfluoroalkoxyphosphazenes are described in U.S. Pat. No. 3,970,533. Methods of curing such polymers by sulfur vulcanization, free-radical (e.g., peroxide) cure and by reaction are also well known.

SUMMARY

The present invention is directed to a fire resistant cushioning material that comprises a fire-blocking sheet and a polyurethane core. Such cushioning material will pass California Technical Bulletin 133 test, as developed by the California Department of Consumer Affairs, Bureau of Home Furnishings. The cushioning material is a laminar structure comprising an outer foamed polyphosphazene lamella and a foamed polyurethane inner lamella. The foamed polyphosphazene lamella may contain a substantially unfoamed thin layer at the top and/or bottom surface. The polyphosphazene lamella will cover and/or be attached to the polyurethane lamella by, for example, an adhesive, physical fasteners, and the like and lie on top of or it may partially or totally wrap around the polyurethane lamella. The composite cushioning material may optionally be covered by a decorative fabric such as is commonly used for seat cushions, upholstered furniture, mattresses and the like. In some cases it may be preferred to laminate the polyphosphazene lamella to the decorative fabric and subsequently cover the polyurethane lamella with this laminate.

DETAILED DESCRIPTION OF THE INVENTION

Figure 1:
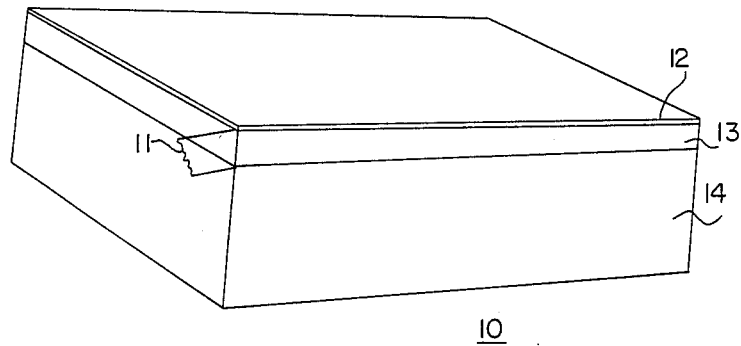

A preferred embodiment of the present invention is a composite material having utility as a fire resistant cushioning material which comprises a polyphosphazene lamella overlaying or wrapping around a polyurethane lamella.

Polyorganophosphazenes have a linear backbone of

units in which n has a value from about 100 up to 100,000 or more. They are made by first heating purified phosphonitrilic chloride trimer to about 200°–250° C. in an inert atmosphere preferably in the presence of one of the known catalyst for the polymerization. After about 12–24 hours, a linear polyphosphonitrilic chloride ("chloropolymer") will form having an intrinsic viscosity of about 0.9–1.1 deciliters/gram. This can be purified by dissolving in a solvent such as tetrahydrofuran and then mixing the solution with an aliphatic hydrocarbon such as heptane causing the high molecular weight chloropolymer to precipitate. The purified chloropolymer can then be dissolved in a solvent such as tetrahydrofuran (THF) and a THF solution of the desired sodium alkoxide or aryloxide added to it. These compounds react to form a polyorganophosphazene in which the organo groups correspond to the alkoxide or aryloxide groups in the THF solution. The product can be washed and precipitated with water. The precipitated gum is then dried and then compounded following standard rubber technology such as by intensive mixing in a Banbury mixer.

The substituents bonded to phosphorus can vary widely and include substituted and unsubstituted alkoxy and aryloxy groups wherein the substituent groups on the alkoxy or aryloxy can be halogen (e.g., chlorine, fluorine), alkyl, alkoxy, polyalkoxy, dialkylamino, trifluoromethyl, aryloxy, alkenyl (e.g., allyl).

U.S. Pat. No. 3,994,838 describes a phosphazene useful in making the fire blocking sheet used in this invention.

The preferred polyorganophosphazene is a polyaryloxy phosphazene such as that described in Rose et al. U.S. Pat. No. 3,856,713 incorporated herein by reference. These polymers have both phenoxy and alkylphenoxy groups substituted on phosphorus. In a more preferred embodiment about 20–79 mole percent of the substituent groups on phosphorus are phenoxy and about 79–20 mole percent are lower alkyl phenoxy, especially p-ethylphenoxy. At least one mole percent and up to about 15 mole percent of the substituent groups on phosphorus are olefinically unsaturated groups such as allyl, o-allylphenoxy, p-allylphenoxy, eugenoxy, isoeugenoxy and the like. Most preferably the olefinically unsaturated groups are o-allylphenoxy. These groups promote crosslinking during the cure stage whether by sulfur-curing or peroxide-curing. In order to produce the foam used in the present invention, from about 1 to about 40 parts per hundred based on phosphazene polymer of at least one chemical blowing agent and activator are required. Azodicarbonamide is typical of such blowing agent. Foams with densities as low as at least 3.4 lbs/ft$^3$ or lower are effective in the barrier sheets of the present invention.

The polyorganophosphazene gum is compounded with certain additives to enhance its properties. The additives include fillers such as aluminum trihydrate (ATH), magnesium hydroxide, hydrated magnesium carbonate, silane treated silica and the like; processing aids such as silicone rubber (e.g., Silastic HA-2 Dow Corning Company); and stabilizers such as Ethanox 330 or 376 Antioxidant, (Ethyl Corporation).

The polyorganophosphazene sheet can be cured or uncured in the composite material. Preferably the sheet is cured. When used as a fire resistant cushioning material, curing is necessary to give adequate physical integrity.

Curing agents such as a peroxide (e.g., t-butyl perbenzoate) or the combination of sulfur and a vulcanizing accelerator system, e.g., Methyl Zimate, Butyl Zimate, Vanax 552 (products of R.T. Vanderbilt Company) can be used.

A typical formulation used in making the phosphazene lamella is as follows:

TABLE I

|  | Parts by Weight |
| --- | --- |
| Polyaryloxyphosphazene gum | 100 |
| ATH | 100–200 |
| Titanium Dioxide | 0–10 |
| Sulfur | 0.5–2.0 |
| Processing Aid | 10 |
| Zinc Stearate | 10 |
| Carbowax | 2.0–10.0 |
| Blowing Agent | 18 |
| Trimer Oil | 5–10 |
| Accelerators | 1.0–4.0 |

The ingredients are mixed in a conventional Banbury mixer, sheeted out on a 2-roll mill to the desired thickness and then fed to a calender to form the uncured polymer which is then cured in an autoclave at about 150° C. for 360 minutes.

Because of the mixing and subsequent curing process, a polyphosphazene foam results that typically is composed of a thin layer of substantially unfoamed material on both sides of the foamed polymer layer. A product with a single layer of substantially unfoamed material is readily obtained from this structure by cutting the sheet in two. A polyphosphazene without any substantially unfoamed layers is obtained by cutting and removing the unfoamed "skins" from both sides of the foamed sheet.

Where one or both of the unfoamed portions are desired then the thickness of these unfoamed lamelliform layers can be adjusted depending on mixing and curing conditions. Since the fire blocking ability of the polyphosphazene is dependent on the thickness of both the unfoamed layer as well as the foamed layer, it is important to control mixing and curing to result in optimal properties. Thus, the lamelliform, substantially unfoamed layer should have a minimum thickness of about 0.01 mm but should not exceed about 0.2 mm. This unfoamed layer can play a significant role in the fire barrier property of the cushioning material and also provides good physical integrity to the outer surface of foamed polyphosphazene lamella. Resistance to puncture for example is improved by the presence of such unfoamed layer.

The substantially foamed second layer, in order to be an effective fire barrier should be at least 0.5 mm in thickness. Because of economic considerations the foam should be as thin as possible, typically 1.4 mm in thickness.

Polyurethanes are a well recognized class of polymer taking their name from ethyl carbamate (urethane). They typically have the repeating unit [R-NH-C(O)O-R'-O(O)CNH] where R is usually an aromatic polyisocyanate and R' an aromatic or aliphatic polyol.

Representative polyols which may be employed in the preparation of the flame retardant polyurethane foams are well known to those skilled in the art. They are often prepared by the catalytic condensation of an alkylene oxide or mixture of alkylene oxides either simultaneously or sequentially with an organic compound having at least two active hydrogen atoms, such as disclosed in U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyol will vary from 100 to 10,000.

The polyhydroxy polyesters are typically prepared from the reaction of polycarboxylic acids and polyhydric alcohols. Any suitable polycarboxylic acid may be used including oxalic acid, malonic acid, maleic acid, fumaric acid, isophthalic acid, terephthalic acid, 1,4-cyclohexanedicarboxylic acid and the like. Any suitable polyhydric alcohol, including both aliphatic and aromatic, may be used such as ethylene glycol, propylene glycol, sorbitol, etc. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and Encylopedia of Chemical Technology, Vol. 7, pp. 257–262, published by Interscience Publishers, Inc. (1951) or in U.S. Pat. No. 1,922,459. polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from 72 percent to about 95 percent.

The polyurethane foams employed in the present invention are generally prepared by the reaction of one or more of the illustrated polyols with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in Reissue U.S. Pat. No. 24,514 together with suitable machinery to be used in conjunction therewith. When water is added as the blowing agent, corresponding quantities of excess isocyanate to react with the water and produce carbon dioxide may be used.

It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representatives of these types are the diisocyanates such as m-phenylene diisocyanate, 2,4-toluene diisocyanate, 2,6-toluene diisocyanate, mixtures of 2,4- and 2,6-toluene diioscyanate, hexamethylene diisocyanate, tetramethylene diisocyanate, cyclohexane, 1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-methyl-4,4'-biphenyl diisocyanate and 3,3'-dimethyl-diphenylmethane-4,4'-diisocyanate; the triisocyanates such as 4,4',4''-triphenylmethane triisocyanate, and toluene 2,4,6-triisocyanate, and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate. Toluene diisocyanate is preferred.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)-ethylenediamine, N-(2-hydroxypropyl)ethylenediamine, N,N'-di-(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-diamethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these the nonionic surface active agents such as the tertiary amine or alkanolamine salts of long chain alkyl acid sulfate esters, alkyl sulfonic esters, and alkyl arylsulfonic acids are not preferred.

Flame retarded polyurethane foams also have dispersed throughout their mass melamine particles that may vary in particle size from about 1.5 microns to less than 10 microns. The smaller particle sizes are preferred. Typically such melamine particles are present in the foam from concentrations of about 5% by weight to about 55% by weight based on the total amount of polyurethane starting materials.

Other flame retardant additives may also be included in the polyurethane foam. Among such other flame retardants, and particularly useful with melamine are tetrakis(2-chloroethyl)ethylene phosphonate, pentabromodiphenyl oxide tris(1,3-dichloropropyl)phosphate, tris(beta-chlorethyl)phosphate, molybdenum trioxide, ammonium molybdate, ammonium phosphate, pentabromodiphenyloxide, tricresyl phosphate, 2,3-dibromopropanol, hexabromocyclododecane, dibromoethyldibromocyclohexane, tris(2,3-dibromopropyl)phosphate, and tris(beta-chloropropyl)phosphate. They are preferably used in an amount of from about 1 to about 15 weight percent of the total weight of the composition.

The actual construction of the cushioning material is shown in its simpliest form in FIG. 1. In this cross sectional view of a cushion structure (10), the foamed polyphosphazene outer lamella (11) (approximately 0.25 to 5 mm in thickness: preferably about 1 to 3 mm thick) composed of the substantially unfoamed layer (12) and the foamed layer (13) covers the surface of the foamed polyurethane lower lamella (14). This lower lamella may be from 10 to 300 mm in thickness or more, but is usually 50 to 150 mm in thickness. As noted earlier, these lamella may be secured by physical fasteners (staples, nails, screws, etc.) or by adhesives. Such adhesives are disclosed for example in U.S. Pat. No. 4,468,431. Other useful adhesives are:

| Adhesives | Mfg. |
| --- | --- |
| Sealfas ® Coating | H. B. Fuller |
| Foster 81-33 | H. B. Fuller |
| Spark-Fas | H. B. Fuller |
| ECO-TACK N.F. | Mon-Eco Industries |
| Mono-Tack S-E | Mon-Eco Industries |
| Armstrong 520 Adhesive | Armstrong World Industries |
| 3M80 | 3M Company |

Figure 2:
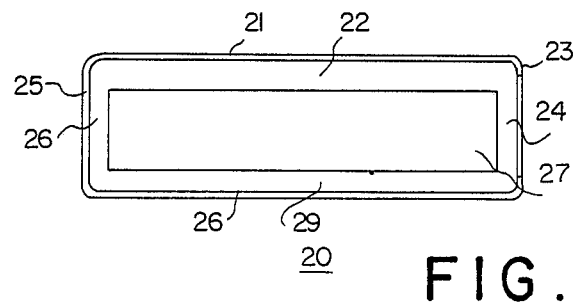

FIG. 2 shows an embodiment of the present invention where the foamed polyphosphazene wraps around the polyurethane lamella. The cushioning material (20) has an outer, upper polyphosphazene sheet of substantially unfoamed polyphosphazene (21) and substantially foamed polyphosphazene (22) and an outer, lower polyphosphazene sheet of substantially unfoamed polyphosphazene (28) and substantially foamed polyphosphazene (29). Side wraps of the polyphosphazene sheet extend down either side of the polyurethane lamella (27). Thus, on either side of the polyurethane substantially unfoamed layers (23 and 25), overlaying substantially foamed layers (24 and 26) can be seen to fully envelope the foamed polyurethane (27). It should be noted that depending on the use, the entire foamed polyurethane lamella can be enveloped by the fire barrier sheet as shown in FIG. 2 or only various parts of it.

TESTING FOR FLAMMABILITY OF CUSHIONING MATERIAL

Testing for Examples 1-18 was conducted by burning five double sheets of newspaper on a full scale mock-up protected by a 4 sided enclosure. Weight loss was the criterion for passage or failure of the sample in accordance with the weight loss requirements given in California Technical Bulletin-133.

The polyphosphazene foams used in these tests (Examples 1-18) had the following formulations:

| FOAM I | |
| --- | --- |
| | Parts by Weight |
| Polyaryloxyphosphazene gum | 100 |
| Aluminum trihydrate | 120 |
| Titanium dioxide | 0.8 |
| Silastic ® HA-2 | 10 |
| Zinc Stearate | 10 |
| Carbowax | 2 |
| Blowing Agent | 18 |
| Trimer Oil | 5 |
| Sulfur & Accelerators | 1.7 |

| FOAM II Polyphosphazene Foam Composition | |
| --- | --- |
| | Parts by Weight |
| Polyaryloxyphosphazene gum | 100 |
| Aluminum trihydrate | 180 |
| N990 | 10 |
| Zinc Stearate | 10 |
| Silastic ® HA-2 | 10 |
| Trimer Oil | 12 |
| Carbowax | 2 |
| Blowing Agent | 25 |
| Sulfur & Accelerators | 5.25 |

TABLE

Examples 1-20

| EXAMPLES | BARRIER | FABRIC[1] | FOAM[1] | RESULTS[3] Weight Loss | Pass/Fail |
| --- | --- | --- | --- | --- | --- |
| 1 | none | polypropylene | Cal-117 | | Fail |
| 2 | none | wool | melamine | 2.7% | Pass |
| 3 | 2 mm no skin Foam I[4] | polypropylene | Cal-117 | | Fail |
| 4 | 2 mm no skin Foam I | polyester | Cal-117 | | Fail |
| 5 | 2 mm no skin Foam I | nylon | Cal-117 | | Fail |
| 6 | 4 mm skin Foam I | polypropylene | Cal-117 | | Fail |
| 7 | 2 mm Foam I skin[5] | polypropylene | Cal-117 | | Fail |
| 8 | 2 mm Foam I skin | wool | Cal-117 | 3.0% | Pass |
| 9 | 1 mm Foam I skin | wool | Cal-117 | 2.5% | Pass |
| 10 | 4 mm Foam I skin | wool | Cal-117 | 3.2% | Pass |
| 11 | 4 mm Foam I skin | polypropylene | Cal-117 | 6.1% | Pass |
| 12 | 4 mm Foam I skin | cotton | Cal-117 | 8.0% | Pass |
| 13 | ¼" PI 301 | nylon | Cal-117 | | Fail |
| 14 | Kevlar fabric | polyester | Cal-117 | | Fail |
| 15 | ¼" Foam II 1 skin | nylon | Cal-117 | 11% | Borderline Fail |
| 16 | ¼" Foam II 1 skin | wool | Cal-117 | 5% | Pass |
| 17 | ¾" Foam II 2 skin | cotton | Cal-117 | 10% | Pass |

TABLE-continued

Examples 1–20

| EXAMPLES | BARRIER | FABRIC[1] | FOAM[1] | RESULTS[3] Weight Loss | Pass/Fail |
|---|---|---|---|---|---|
| 18 | ¾" Foam II 2 skin | polypropylene | Cal-117 | 12% | Borderline Fail |

[1]The fabric coverings from the above examples are as follows:
Polyester - 44% polyester, 52% rayon, 4% polypropylene fabric of jacquard weave and fabric weight of 15 oz/yd². Pattern and color are wedgewood. By Culp, Inc.;
Nylon - 100% nylon fabric. Pattern is winner and color is charcoal. It has a fabric weight of 15 oz/yd². By Culp, Inc.;
Polypropylene - 100% polypropylene fabric. Pattern is tribute and color is ash. It has a fabric weight of 15 oz/yd². By Culp, Inc.;
Wool - 100% wool fabric. Pattern is Sheffield and color is green. It has a fabric weight of 20 oz/yd². By Shelby Williams; and
Cotton - 100% cotton velvet. The color is blueberry. It has a fabric weight of 21 oz/yd². By J. L. DeBall & Grimes of America.
[2]Cal-117 is a polyurethane flexible foam capable of passing the requirements of a California Technical Bulletin 117. The foam used in these tests had a density of 1.8 lb/ft³.
[3]Results mean the following:
Pass - where the test specimen has less than or equal to 10% weight loss in the first ten minutes of testing (as required by Cal 133).
Fail - where the test specimen has a weight loss of greater than 10% in the first ten minutes of testing (as required by Cal 133).
Borderline Fail - where the test specimen has a weight loss of close to 10% in the first ten minutes of testing.
[4]The cushion dimension for the Foam I and Foam II were back and bottom cushions 16" × 16" × 3".
[5]The skin thickness is approximately .01-.05 mm.

We claim:

1. A composite fire resistant laminar cushioning material comprising (i) a foamed polyphosphazene outer lamella said lamella having a lamelliform, substantially unfoamed first outer layer and a substantially foamed second layer and (ii) a foamed polyurethane inner lamella.

2. The cushioning material in accordance with claim 1 wherein said foamed polyphosphazene is a polyaryloxyphosphazene.

3. The cushioning material in accordance with claim 2 wherein the aryloxy groups of said polyaryloxyphosphazene comprise the groups phenoxy and $C_1$ to $C_6$ linear or branched alkyl-substituted phenoxy.

4. The cushioning material in accordance with claim 3 wherein said alkyl-substitution is ethyl.

5. The cushioning material in accordance with claim 3 wherein said polyaryloxyphosphazene is cured and wherein said group additionally include at least one mole percent up to about 15 mole percent of one or more crosslinking groups derived from olefinically unsaturated substituents.

6. The cushioning material in accordance with claim 5 wherein said olefinically unsaturated group is ortho-allyphenoxy.

7. The cushioning material in accordance with claim 3 wherein said polyaryloxyphosphazene has a foam density of at least 3.4 lbs/ft³.

8. The cushioning material in accordance with claim 1 wherein said lamelliform, substantially unfoamed first outer layer is from about 0.01 mm to about 0.2 mm in thickness.

9. The cushioning material in accordance with claim 1 wherein said substantially foamed second layer is from about 0.25 mm to about 50 mm in thickness.

10. The cushioning material in accordance with claim 1 wherein said foamed phosphazene outer lamella completely encloses said foamed polyurethane lamella.

11. The cushioning material in accordance with claim 1 wherein said foamed phosphazene outer lamella is covered by a fabric.

12. The cushioning material in accordance with claim 11 wherein said fabric is a fabric from a polyester, nylon, polypropylene, wool, cotton or blends thereof.

13. A composite fire resistant laminar cushioning material comprising (1) a foamed polyphosphazene outer lamella said lamella having a lamelliform, substantially unfoamed first outer layer, a substantially foamed second layer and a lamelliform substantially unfoamed third innner layer and (ii) a foamed polyurethane inner lamella.

14. A method for producing a composite fire resistant laminar cushioning material comprising enclosing a foamed polyurethane inner lamella with a foamed polyphosphazene outer lamella said outer lamella having a substantially unfoamed first outer layer and a substantially foamed second layer.

15. The method in accordance with claim 14 wherein said foamed polyphosphazene is a polyaryloxyphosphazene.

16. The cushioning material in accordance with claim 15 Wherein the aryloxy groups of said polyaryloxyphosphazene comprise the groups phenoxy and $C_1$ to $C_6$ linear or branched alkyl-substituted phenoxy.

17. The cushioning material in accordance with claim 16 wherein said alkyl-substitution is ethyl.

18. The cushioning material in accordance with claim 16 wherein said polyaryloxyphosphazene is cured and wherein said group additionally include at least one mole percent up to about 15 mole percent of one or more crosslinking groups derived from olefinically unsaturated substituents.

19. The cushioning material in accordance with claim 18 wherein said olefinically unsaturated group is ortho-allyphenoxy.

20. The cushioning material in accordance with claim 16 wherein said polyaryloxyphosphazene has a foam density of at least 3.4 lbs/ft³.

21. The cushioning material in accordance with claim 1 wherein said lamelliform, substantially unfoamed first outer layer is from about 0.01 mm to about 0.2 mm in thickness.

22. The cushioning material in accordance with claim 1 wherein said substantially foamed second layer is from about 0.25 mm to about 50 mm in thickness.

23. The cushioning material in accordance with claim 1 wherein said foamed phosphazene outer lamella completely encloses said foamed polyurethane lamella.

24. The cushioning material in accordance with claim 1 wherein said foamed phosphazene outer lamella is covered by a fabric.

25. The cushioning material in accordance with claim 24 wherein said fabric is a fabric from a polyester, nylon, polypropylene, wool, cotton or blends thereof.

26. A method of producing a composite fire resistant laminar cushioning material comprising enclosing a foamed polyurethane inner lamella with a foamed polyphosphazene outer lamella said outer lamella having a lamelliform substantially unfoamed first outer layer, a substantially foamed second layer and a lamelliform substantially unfoamed third inner layer.

27. The method in accordance with claim 26 wherein said lamelliform substantially unfoamed first outer layer and said lamelliform substantially unfoamed third inner layer are removed prior to enclosing said polyurethane lamella.

28. The method in accordance with claim 26 wherein the foamed polyurethane inner lamella is fully enclosed by said foamed polyphosphazene outer lamella.

29. The method in accordance with claim 27 wherein the foamed polyurethane inner lamella is fully enclosed by said foamed polyphosphazene outer lamella.

* * * * *